United States Patent
Robinson et al.

(10) Patent No.: US 10,375,442 B2
(45) Date of Patent: *Aug. 6, 2019

(54) COPY PROTECTION SYSTEM

(71) Applicant: SMARDTV SA, Cheseaux-sur-Lausanne (CH)

(72) Inventors: David John Michael Robinson, Keighley (GB); John Paul Robinson, Keighley (GB)

(73) Assignee: SMARDTV SA, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,670

(22) Filed: Oct. 20, 2016

(65) Prior Publication Data

US 2017/0041665 A1    Feb. 9, 2017

Related U.S. Application Data

(63) Continuation of application No. 14/232,148, filed as application No. PCT/EP2012/063195 on Jul. 5, 2012, now Pat. No. 9,479,829.

(30) Foreign Application Priority Data

Jul. 5, 2011  (EP) .................... 11172750

(51) Int. Cl.
*H04N 7/16*     (2011.01)
*H04N 21/4408*  (2011.01)
(Continued)

(52) U.S. Cl.
CPC ......... *H04N 21/4408* (2013.01); *H04N 5/913* (2013.01); *H04N 21/2541* (2013.01);
(Continued)

(58) Field of Classification Search
CPC .......... H04N 21/4353; H04N 21/4405; H04N 21/83; H04N 21/8352; H04N 21/8358; H04N 21/2585

See application file for complete search history.

(56) References Cited

U.S. PATENT DOCUMENTS 4,694,490 A * 9/1987 Harvey .................. H04H 20/14
                                                    348/484
5,926,550 A * 7/1999 Davis ................. H04N 1/32101
                                                    380/243
(Continued)

FOREIGN PATENT DOCUMENTS

EP        1480455     11/2004
WO     WO 97/43866    11/1997

OTHER PUBLICATIONS

Office Action issued in EP 11 172 750.9 dated Jan. 12, 2017.
(Continued)

*Primary Examiner* — Pankaj Kumar
*Assistant Examiner* — Timothy R Newlin
(74) *Attorney, Agent, or Firm* — Oblon, McClelland, Maier & Neustadt, L.L.P.

(57) ABSTRACT

A method of modifying the output of an output device is provided. A first code, associated with a first recipient party, is received and used to generate, within the output device, a second code, the second code containing encoded data identifying the first recipient party and instructions for activating an additional functionality of the output device. The additional functionality is activated in accordance with the instructions contained in the second code. The output of the output device is modified according to data encoded in the second code, to encode a third code in the output of the output device, the third code including an ID code associated with the first recipient party.

31 Claims, 7 Drawing Sheets

(51) Int. Cl.
*H04N 5/913* (2006.01)
*H04N 21/254* (2011.01)
*H04N 21/8355* (2011.01)

(52) U.S. Cl.
CPC ............. *H04N 21/8355* (2013.01); *H04N 2005/91307* (2013.01); *H04N 2005/91314* (2013.01); *H04N 2005/91357* (2013.01)

(56) References Cited

U.S. PATENT DOCUMENTS

| | | | |
|---|---|---|---|
| 5,933,773 A | 8/1999 | Barvesten | |
| 6,002,772 A * | 12/1999 | Saito | G06F 21/10 |
| | | | 348/E7.056 |
| 6,285,774 B1 * | 9/2001 | Schumann | H04N 5/913 |
| | | | 375/E7.026 |
| 6,952,685 B1 * | 10/2005 | Hunter | G06F 21/10 |
| | | | 348/E7.063 |
| 7,050,698 B1 * | 5/2006 | Quan | G11B 20/00086 |
| | | | 348/E9.037 |
| 7,149,309 B1 * | 12/2006 | Silver | H04N 7/163 |
| | | | 348/E5.004 |
| 2001/0049740 A1 | 12/2001 | Karpoff | |
| 2002/0044653 A1 * | 4/2002 | Baek | H04L 9/002 |
| | | | 380/42 |
| 2002/0172362 A1 * | 11/2002 | Wonfor | H04N 5/913 |
| | | | 380/201 |
| 2003/0061607 A1 * | 3/2003 | Hunter | B82Y 10/00 |
| | | | 725/32 |
| 2003/0110509 A1 | 6/2003 | Levinson et al. | |
| 2004/0085446 A1 * | 5/2004 | Park | H04N 7/1675 |
| | | | 348/143 |
| 2006/0048237 A1 * | 3/2006 | Luo | H04L 63/0428 |
| | | | 726/32 |
| 2006/0050286 A1 * | 3/2006 | Silverbrook | B41J 2/14427 |
| | | | 358/1.1 |
| 2006/0056728 A1 | 3/2006 | Silverbrook et al. | |
| 2006/0056809 A1 | 3/2006 | Quan | |
| 2007/0011456 A1 * | 1/2007 | Boice | H04N 5/913 |
| | | | 713/176 |
| 2007/0019836 A1 * | 1/2007 | Thorwirth | G06T 1/0028 |
| | | | 382/100 |
| 2007/0245386 A1 * | 10/2007 | Morley | G11B 20/00007 |
| | | | 725/78 |
| 2007/0282749 A1 * | 12/2007 | Nonaka | G11B 20/00086 |
| | | | 705/51 |
| 2007/0291855 A1 * | 12/2007 | Reznic | H04L 1/0089 |
| | | | 375/240.27 |
| 2009/0290711 A1 * | 11/2009 | Bloom | H04N 7/163 |
| | | | 380/239 |
| 2009/0313665 A1 * | 12/2009 | Rouse | H04N 7/1675 |
| | | | 725/93 |
| 2010/0111496 A1 | 5/2010 | Quan | |
| 2010/0226525 A1 * | 9/2010 | Levy | G06F 21/10 |
| | | | 382/100 |
| 2010/0313030 A1 * | 12/2010 | Yang | H04N 7/163 |
| | | | 713/176 |
| 2011/0135277 A1 * | 6/2011 | Quan | H04N 5/913 |
| | | | 386/256 |
| 2013/0212669 A1 * | 8/2013 | Wilson | H04L 63/1416 |
| | | | 726/12 |
| 2013/0223671 A1 * | 8/2013 | Jin | H04N 21/8358 |
| | | | 382/100 |
| 2013/0236046 A1 * | 9/2013 | Nallusamy | G06F 21/16 |
| | | | 382/100 |

OTHER PUBLICATIONS

International Search Report issued in International Application No. PCT/EP2012/063195, dated Sep. 28, 2012.
Written Opinion issued in International Application No. PCT/EP2012/063195, dated Sep. 28, 2012.
Extended European Search Report issued in EP 11172750.9 dated Oct. 28, 2011.

* cited by examiner

COPY PROTECTION SYSTEM

CROSS-REFERENCES TO RELATED APPLICATIONS

This application is a continuation of U.S. patent application Ser. No. 14/232,148 filed May 14, 2014, which is a National Stage for International Application No. PCT/EP2012/063195 filed Jul. 5, 2012, which claims priority to European Application No. 11172750.9, filed Jul. 5, 2011.

FIELD OF INVENTION

The present invention relates to copy protection systems and particularly analogue copy protection for television systems.

BACKGROUND OF INVENTION

Output devices, such as user devices for receiving broadcasts, decoding the broadcast, and outputting media content, such as video and/or audio content are in widespread use. One such example is a set-top-box (STB) used to receive broadcast television programmes, decode the broadcast and output programming to a display device.

Typically, output devices such as STBs consist of one or more silicon chips, other hardware components, and software from one or more sources. Key technologies destined for the STB are designed and/or manufactured by a first company and incorporated into silicon chips by a second company. These silicon chips are then provided to a third company, such as a STB manufacturer, who then assembles these and other software and/or hardware components into a STB. The STB may then be provided to a network operator who provides content to an end user for distribution e.g. on a subscription basis, or sold to an end user for the purpose of receiving content from a network operator. In this way, the silicon chip, and hence the STB, may have dormant functionality that is only activated under the control of the first company.

STBs, or components of them, can be programmed or configured to offer certain technologies or functionality to the STB manufacturer. For example, a component, when inserted into a STB by a STB manufacturer, may endow the STB with the capability of applying copy protection to received content such that subsequent video content output by the STB cannot be copied by a recording device. The first company may charge the third company and/or the network operator a license fee to use the functionality, such as the copy protection functionality. Unfortunately, it is not uncommon for an unscrupulous party to attempt to circumvent the license fee and provide the additional functionality in their set top boxes and/or networks.

In order to enforce the license fee it is advantageous to be able to prove that the signal output by a STB, is associated with a particular party, such as a particular network operator or STB manufacturer.

SUMMARY OF THE INVENTION

The invention is defined in the independent claims to which reference is now directed. Preferred features are set out in the dependent claims.

Embodiments of the invention may relate to a method that applies to output devices, such as STBs, in which additional functionality may be enabled by entering a code into the device. A functionality, F, may be effectively lying dormant within the device until it is enabled under the control of a controlling entity, CE. This may occur by the CE providing a first code to first recipient party known as an associated party, AP, who then enters the first code into the device. The code causes the device to modify its operation, either by virtue of containing appropriate instructions or unlocking existing instructions in the device, such that functionality F is enabled. AP, who may be a STB manufacturer for example, may then sell on the output device with functionality F enabled. The first code provided by CE to AP in order to activate functionality F may be unique to the AP, but this would not prevent AP from unscrupulously providing their unique code to a second unauthorised recipient entity UR. UR may then obtain output devices in which the additional functionality F has not been enabled, and enable this functionality using the unique code of AP. In order for such a security breach to occur, AP must perform the initial breach by providing their code to UR. However, according to embodiments of the invention, as well as initiating functionality F, the first code also results in an alteration of the output of the output device. This is done by generating, within the output device, a second code which contains the instructions, decoded from the first code, that can be implemented on the output device to activate the new functionality F. The second code also contains instructions to encode, in the output of the output device, a third code that uniquely identifies the first recipient entity AP. As a result, any device that has functionality F enabled as a result of using AP's first code can be traced back to AP using the output of the output device. This applies equally to output devices in which functionality F has been enabled by other recipient parties who are illegally using AP's unique code.

Embodiments of the invention may provide a method of modifying the output of an output device. The method comprises retrieving a first code, associated with a first recipient party, to activate an additional functionality of the output device. The first code is used to generate, within the output device, a second code containing encoded data identifying the first recipient party and instructions for activating an additional functionality of the output device. The additional functionality is activated in accordance with the instructions contained in the second code by the output device following these instructions. The output of the output device is also modified according to data encoded in the second code, preferably being the data identifying the first recipient party, to encode a third code in the output of the output device, the third code including an ID code associated with the first recipient party (the third code may be known as an ID code for convenience, since it contains an ID code, and the term is used throughout the description). As a result, the output of the output device, which has had additional functionality activated, can be traced back to the first recipient party.

The ID code may preferably not be derivable from the first code in an obvious manner, with the first code being encrypted such that the second code is obtained by decrypting the first code. In this manner, a first code, stored on the output device in order to activate the latent functionality, may not be derived from the ID code encoded in the output of the output device. The first code is also preferably not derivable from the second code in an obvious manner. Again, this ensures that the manner in which second codes are generated to activate the latent functionality is not easily derivable.

The first code may preferably comprise n bits and the second code comprise m bits, wherein n is greater than m, and wherein only a sub-set of n-bit first codes are valid such that they generate a valid m bit second code that activates the additional functionality F. In this manner, it is challenging for a hacker to find valid first codes by random probing of the output of the output device. Generating the second code may further include checking whether the first code is a valid code, being a code that generates a valid second code that activates the additional functionality. For all other non-valid n-bit first codes other than the valid n-bit first codes, a fixed unusable m-bit second code may be generated such that the additional functionality F is not activated. This makes probing of the device by a hacker even more difficult since any incorrect or invalid first code produces a common fixed output making it harder to ascertain the inner workings of the device activate the functionality F. The method further comprise impairing or disabling the output device when an invalid n-bit code is used to generate a second code so that attempts to probe the device are even more challenging to a hacker.

The output of the output device is preferably a video signal and the additional functionality activated by the first code is preferably copy protection of the video signal, the second code containing instructions on how copy protection should be applied to the output device's output. The copy protection may be applied by modifying at least a portion of a line within a frame of video, the lines preferably being located within the vertical blanking interval.

The copy protection may be applied by altering sync pulses within lines of video and the third code is encoded in the output video signal by selecting which sync pulses are altered based on the instructions contained in the second code. The sync pulses may be altered by altering their duration, preferably the duration to which they are altered does not correspond to the duration of other pulses within the video signal. The alteration to the sync pulse may include inserting an additional pulse into the sync pulse, such as an AGC pulse, the additional pulse spanning between a first time $t_1$ and a second time $t_2$, wherein, preferably, the additional pulse time does not correspond to a pulse time found in another portion of the video signal, or the portion of the video signal above the blanking level. It is also possible that the AGC pulse is added separately to, and without requiring the modification of, the sync pulses. The edge of the additional pulse may coincide with an edge of a sync pulse, and preferably a trailing edge. The value of $t_1$ may be between 2 µs and 5 µs from the start of a line, more preferably 3.8 µs or around, or substantially, 3.8 µs and even more preferably 3.815 µs or around, or substantially, 3.815 µs. The value of $t_2$ may be between 4 µs and 6 µs from the start of a line, more preferably 4.9 µs or around, or substantially, 4.9 µs and even more preferably 4.889 µs or around or substantially 4.889 µs. The value of $t_2-t_1$ ($t_2$ minus $t_1$) may be between 0.5 µs and 3 µs, and preferably 1 µs, or around or substantially 1 µs.

The lines before and/or after the lines modified to incorporate the third code may also be modified to indicate predetermined values, the predetermined values preferably being logic "1".

Embodiments of the invention also provide a corresponding output device. The output device comprises a memory for storing a first code associated with a first recipient party. A secure activation module, coupled to the memory, is provided for generating a second code using the first code, containing encoded data identifying the first recipient party and instructions for activating an additional functionality of the output device. A modification module is provided, arranged to implement the instructions to activate the additional functionality and further arranged to modify the output of the output device according to data encoded in the second code, to encode a third code in the output of the output device, the third code including an ID code associated with the first recipient party. The output device also has an output.

Embodiments of the invention may also provide an integrated circuit for use in an output device, such as the one mentioned just above, the integrated circuit comprising a secure activation module and a modification module. The secure activation module is arranged to receive a first code associated with a first recipient party and to use the first code to generate a second code, the second code containing encoded data identifying the first recipient party and instructions for activating an additional functionality of the output device. The modification module is arranged to implement the instructions to activate the additional functionality and further arranged to modify the output of the output device according to data encoded in the second code so as to encode a third code in the output of the output device, the third code including an ID code associated with the first recipient party.

The secure activation module may be arranged to generate the second code by decrypting the first code.

The first code may comprise n bits and the second code m bits, wherein n is greater than m, and wherein only a sub-set of n-bit first codes are valid such that they generate a valid m bit second code that activates the additional functionality F. The output device or integrated circuit may be further arranged to check whether the first code is a valid code and, for all other n-bit first codes other than the valid n-bit first codes, generate a fixed m-bit second code that does no activate the additional functionality F. The output device or integrated circuit may be further configured to impair or disable the output device when an invalid n-bit code is used to generate a second code.

The secure activation module may be a secure semiconductor component implemented as a monolithic semiconductor integrated circuit. The secure activation module and modification module may be located on a common chip, again preferably being monolithic.

The second code may be passed securely from the secure activation module to the modification module. This may be by virtue of the components being located on the same physical chip, and/or by communications between the secure activation module and the modification module being encrypted and/or password protected. These features make it hard for a hacker to probe the device and determine what changes to the first code make to the second code since the second code is never output from the device or integrated circuit itself.

The output device may be configured to output a video signal, and the modification module may further be arranged to modify the video signal output to apply copy protection of the video signal, the copy protection being applied in accordance with instructions encoded in the second code.

The modification module may be arranged to modify at least a portion of a line within a frame of video, the lines preferably being located within the vertical blanking interval.

The secure activation module and modification module are located on the same chip or integrated circuit as a video encoder module.

The modification module may be arranged to apply copy protection by altering sync pulses within lines of video and to encode the third code in the output video signal by selecting which sync pulses are altered based on the instructions contained in the second code.

Embodiments of the invention may also provide a method, as carried out by the controlling entity, for activating a functionality in an output device such as any of the output devices described above or below. The method comprises generating a first code to activate the functionality of the output device. This is achieved by inserting, within the code, instructions to cause the output device to activate the functionality and associating the code with a first recipient party, the first recipient party being associated with the output device. The method further comprises transmitting the first code to the recipient party for insertion of the first code into the output device.

Embodiments of the invention find particular utility in relation to set top boxes for receiving and decoding media content for output to a display such as a television. The additional functionality being enabled within the set top box may be copy protection of the video signal being output by the set top box. Such copy protection is usually achieved by modifying the output video signal of the set top box such that recording devices either cannot accurately record the output, or can detect the presence of the copy protection signal and as a result do not record the output, or record an obscured output.

As mentioned above, embodiments of the invention rely on the insertion of the third code, which may be known as an identification (ID) code, into the output programme or media content of a STB. The ID code is derived from the second code which is in turn derived from the first code associated with a particular party, such as a STB manufacturer, network operator or anyone who may wish to activate the additional functionality within the STB. The first code uniquely identifies that party, allowing copy protected content originating from their STBs to be traced. The first code also contains the instructions for the STB to modify the STB output (preferably an analogue signal) in order to implement the copy protection measures to prevent the STB output from being copied.

The first code has no obvious relationship to the modifications made to the STB output it produces and can be considered as an "obfuscated" code which requires the STB to decode or deobfuscate in order to apply the correct copy protection. The unique identification code encoded in the STB output, or the instructions as to how to create this code in the output content, as provided by the second code, is not derivable from the first code in an obvious manner. Small changes to the first code result in large and apparently unpredictable changes to the copy protection applied to the output. This may be achieved by standard techniques know to the skilled person. Examples used to achieve this include hash codes, particularly cryptographic hash codes, and any other functions that provide similar functionality. The modifications to the output could be the result of a hash function on the first and or second codes, or portions thereof, for example. An appropriate second code may be generated from a particular first code associated with a given entity by using a hash function, for example.

In this way, embodiments of the present invention tie together the enabling of the additional functionality, such as copy protection, with identification of the authorised party. Furthermore, in so far as the output device manufacturer is concerned, the nature or parameters of the additional functionality are intertwined with the ID signal so that only the controlling entity can usefully set or control the one and the other independently, or at all.

Using such an approach prevents an unscrupulous manufacturer or operator from copying or selling their first codes because they can be traced back to them. It also prevents other operators from making their own first codes to operate within a STB because it is not "in the clear" how the STB decodes the first code to reveal the instructions to apply the additional functionality such as copy protection; it is also, therefore, not possible to decide on what copy protection is required and reverse engineer a first code. If an incorrect first code is applied then the copy protection is incorrectly applied to the output, which results in an unwatchable or impaired output, or no copy protection is applied at all because the functionality was not activated by the incorrect first code. The only first codes that can be used belong to a controlling entity who is aware of how the STB decodes the first codes to produce the second code and in turn the identification code. In addition, it is not possible to derive the second codes from the identification codes. If anyone copies a first code, it can be traced back to the source.

BRIEF DESCRIPTION OF THE FIGURES

Embodiments of the invention will now be discussed in relation to the accompanying Figures in which.

DETAILED DESCRIPTION OF PREFERRED EMBODIMENTS

Embodiments of the present invention may be implemented in conjunction with analogue copy protection methods applied to the analogue output of a STB.

Figure 1:
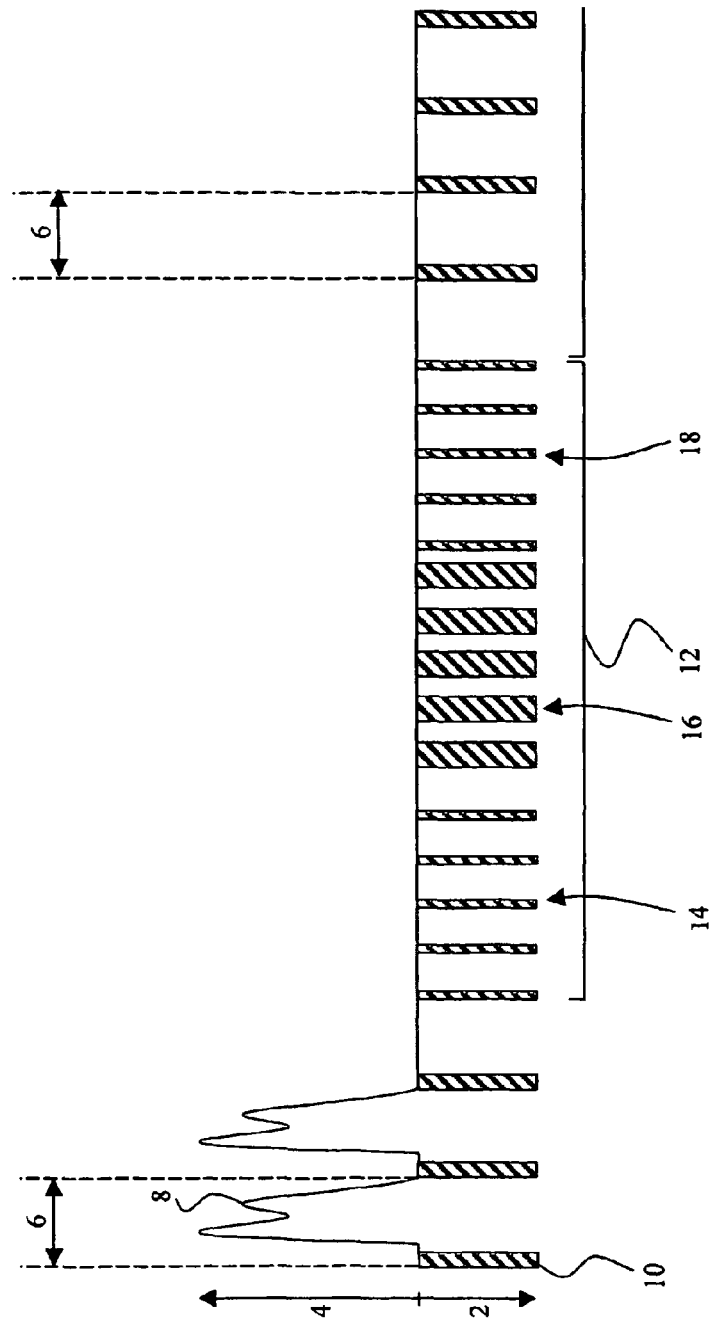
FIG. 1: shows a region of a known video picture signal.

As an example, FIG. 1 shows a region of a known video picture signal 1, such as a phase-alternating-line (PAL) signal. Though the parameters discussed herein are mostly concerned with a UK and/or European standard 625-line SD PAL composite video signal, it will be appreciated that the same principles (and in some instances, substantially the same or similar parameters) can be applied to all variants of PAL, NTSC, SECAM, 625/576-line, 525/480-line, 750/720-line, 1125/1080-line, 1250/1080-line, interlaced, progressive, SD, ED, HD, RF, composite, S-video, SCART, component, RGB etc video formats, systems and interconnections.

The signal comprises synchronisation information 2 for initializing the circuits of a television receiver and picture information 4. The information is arranged into 625 lines 6 which correspond to one full screen of a picture called a frame. There are 625 lines in a PAL signal making up a single frame, and each line of the signal has a length of 64 µs. The following discussion uses timing periods and other parameters based on the 625 PAL standard, but it will be appreciated that the timings and other parameters may need to be adjusted to accommodate the different television standards. It will also be appreciated that, where specific times or other parameters are referred to in the text below, the standards prescribe tolerances for such times and other parameters, and accordingly some variation is permitted from the precise values.

In a conventional Cathode Ray Tube based display, the picture information is displayed on a screen of a television receiver using an electron gun to sweep an electron beam across the screen from the left to the right in a single line. The electron beam also sweeps from the top of the screen to the bottom of the screen to display the lines of the picture signal, and does this twice for a PAL signal. In the first sweep, the odd numbered lines are displayed, after which the electron beam returns to the top to display the even numbered lines. Each pattern of lines displayed on the screen is called a raster and there are therefore two rasters in one frame of a PAL signal. Though such display devices are becoming obsolete, the analogue video signal was designed in conjunction with such display devices, so it is convenient and illuminating to consider their operation when discussing the features of the analogue video signal. Also, most digital display devices, with which embodiments of the invention may be used, are able to receive such an analogue video signal, and even some digital video signals, such as SDI, have some elements related to the analogue video signals described herein, for example, number of active lines, and certain signal timings. Hence this description, and embodiments of the invention herein, is relevant to modern displays and similar technology now, and in the future.

The picture information 4 comprises a positive going wave-form 8, the height of which above the zero-level of the video signal represents the brightness or luma to be displayed at a corresponding point on a line of the screen of the television receiver. The zero-level of the signal is called the blanking level and corresponds to minimum brightness, i.e. the colour black displayed on the screen. In some video formats, such as some versions of NTSC, black sits at a slightly higher voltage than blanking, but this difference is not important to the described embodiments of the invention and is not considered further. Once a line of picture information has been projected on to the television screen, the electron beam must be reset to the left of the screen before the next line can be displayed. This is achieved by negative-going line synchronisation pulses 10, each of width 4.7 μs. A line synchronisation pulse 10 is typically positioned at the start of each line, before any picture information 8.

The video picture signal contains more lines than are usually displayed on the screen of a television receiver; not all lines of the signal are used to display picture information. In particular, two regions of blank lines are provided in the PAL signal in order to control the fly-back of the electron beam from the bottom of the screen to the top, after all of the odd or even numbered lines have been displayed. These regions are called vertical blanking regions 12 and each contains a number of synchronisation pulses which are used to reset the television receiver so that it is ready to display the next frame of picture information. The vertical blanking region contains a series of pre-equalisation pulses 14, vertical synchronisation pulses 16, post-equalisation pulses 18, and a number of blank lines that do not contain any picture information (e.g. 6) which were originally included to allow some time for the scanning circuits in the TV display to 'settle' after the vertical fly-back and before the start of active picture at the top of the display.

In order to implement copy protection, modifications are made to the signal within the vertical blanking region that do not affect the display device output, such as the image projected onto a television screen, but impair the media content or signal as it is copied by a copying device. Such copy protection can be achieved by inserting a pulse of a suitable amplitude and duration into the video signal during the vertical blanking region, which can cause the automatic gain control (AGC) system of a recording device to impair the video signal. An example of such copy protection can be found in U.S. Pat. No. 4,163,253. It should be noted that modifications to the vertical blanking region are preferred, but modifications could equally be made to the horizontal blanking region, or to visible parts of the video signal in some copy protection methods, all of which can be used with embodiments of the invention.

As an example, an AGC signal may cause the AGC system of a video recorder to behave as though the incoming video signal level is significantly above normal level; the AGC system responds by reducing the signal to the storage device below the normal value. Because of this reduced value, on replay the recorded signal will result in poor quality or impaired reproduction on a display such as a television screen. However, copy protection may not necessarily require the recorded signal to be degraded or impaired in this manner. Instead, the signal, which may be entirely watchable, may include additional coding or pulses that can be detected by the receiving or recording equipment, which may take action to prevent copying. On detecting the copy protection coding/pulses the recording device may be configured to activate copy protection measures such as obscuring the output content or simply not recording the content. For example, digital recorders may be configured to detect existing AGC signal pulses, or other indicators of copy protection, and, upon finding them, stop or impair recording. The application of copy protection may only require the introduction of a signal into the output of the device (i.e. the video output of a set top box) that can be detected by a recording device so as to indicate that copy protection is required.

Figure 2:
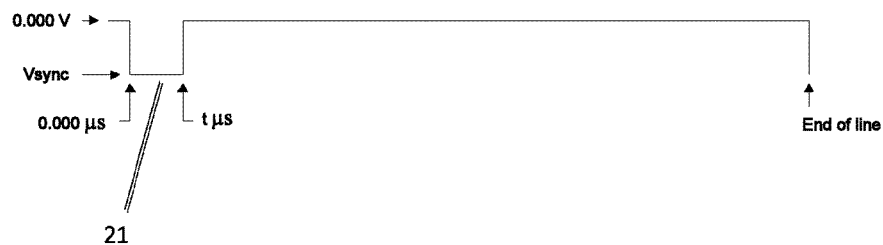
FIG. 2: shows a standard luminance signal line for SD.
Figure 3:
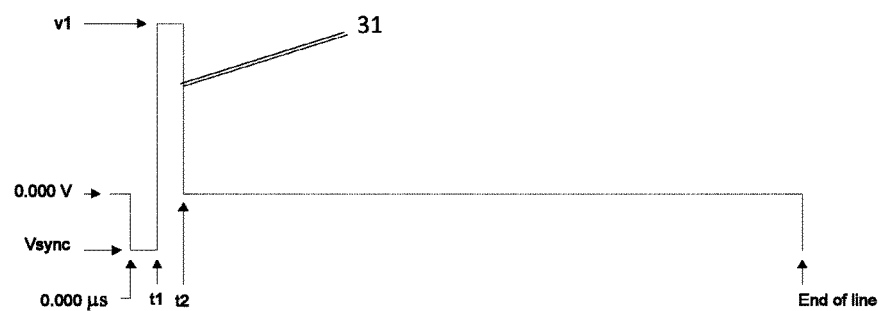
FIG. 3: shows a copy protected luminance signal line.

FIG. 2 shows a standard luminance signal line. In this signal line, an initial sync pulse 21 occurs between O μs and a later time "t" μs as determined by the standard being operated to. There may be a number of these lines occurring during a period in which media content is not being displayed, such as during the vertical blanking period. For example 25 lines of this type may occur during the VBI. FIG. 3 shows how a copy protection signal may be applied. A voltage peak 31 occurs during the sync pulse. This is the AGC pulse referred to above. The AGC pulse occurs between times $t_1$ and $t_2$, these timings being dependent on the standard being operated to, and the chosen parameters of the copy protection signal. These parameters may be chosen to maximise the compatibility of the signal with existing TV displays (i.e. to ensure correct playability), to maximise the interference with the recording circuits in certain types of recording devices (i.e. to improve effectiveness), to ease the task of detecting this signal, to simplify the generation of the signal, or to make this modification to the signal more difficult to reverse, reduce, or remove entirely (i.e. to make "hacking" harder). A preferred choice for these parameters may be a compromise between all these factors. In embodiments of the present invention ease of detection of the copy protection signal may be preferred.

Embodiments of the invention rely on detecting the presence or absence of copy protection modifications to a signal. One method of detecting such modifications, according to some embodiments of the invention, is to look for the AGC pulses themselves. This provides a robust approach because the AGC pulses themselves represent a large voltage difference between the signal without modification, and the signal with modification. However, one alternative method is as follows. The presence of an AGC pulse modifies the duration of the sync pulse relative to an unmodified sync pulse. The sync pulse shown in FIG. 2 is modified as shown in FIG. 3, resulting in the negative going sync pulse between time zero and $t_1$ being shorter in duration than the regular sync pulse. In a standard video signal, different types of sync pulses have various standard values—e.g. 4.7 µs for horizontal sync pulses, 2.35 µs for the pre-equalisation pulses and so on. A common circuit element is a sync separator, which removes the picture information, being the information above the blanking level, leaving only the sync pulses, being the information or pulses below the blanking level. If the AGC pulse is designed such that the duration of the sync pulse in the presence of the sync pulse is substantially different from the duration of any of the below-blanking level features, or pulses, found in a standard video signal, then a comparison circuit can be provided to perform a comparison of the standard sync pulse time duration with the actual, or detected, sync pulse time duration. If the actual sync pulse time duration matches the standard sync pulse time then no AGC pulse is present. If the actual sync pulse time duration does not match, and is preferably a shorter duration, then an AGC pulse can be inferred as being present. The comparison circuit may comprise comparison logic, driven from a timer, triggered by the signal transitions found at the output of a sync separator, and can detect the presence of the "non-standard" duration which is found only in the presence of the ID AGC pulses. This is merely an alternative automated detection mechanism, facilitated by ensuring the duration is different from existing signal features, and made more robust and reliable by ensuring that the duration of the modified sync pulse is as different as possible from existing signal features, for example being substantially between 4.7 µs and 2.3 µs or 2.35 µs, and usually substantially midway between these values. Preferably the value of approximately 3.8 µs is chosen in practice because a small number of TVs are found to be disturbed by a 3.52 µs value. Further, if someone attempts to remove the copy protection, such that the "protected" signal can be recorded, for example onto VHS tape or other recording medium, then the AGC pulses may themselves be removed, e.g. by slicing or gating the signal within the VBI at the blanking level, clamping, or causing, all voltages above blanking to be equal to blanking in this region. However, it is highly unlikely that the attempted removal of the copy protection will restore the sync pulse to its original duration—it will retain the modified duration caused by the introduction of the AGC pulse. In this way, the presence of the copy protection can still be inferred, and encoded information within the copy protection signal modification, such as ID information, as will be described below, can still be detected after modification.

In embodiments in which the apparent duration of the sync pulse in the presence of copy protection such as an AGC pulse is detectably different, the duration of the remainder of the sync pulse, i.e. the period between zero and $t_1$ in FIG. 3, may be arranged to be a period not found in another portion of the video signal. That is, no peaks or pulses below the blanking level (i.e. negative peaks) in the video signal have the same duration as the sync pulse as modified by the AGC pulse. Likewise, the duration of the AGC pulse, between $t_1$ and $t_2$ of FIG. 3, may be arranged so as not to correspond to a period of a peak or pulse found in another portion of the video signal, particularly the above blanking level of the signal.

In addition, ease of generation of the AGC pulses may also be important, since enabling the pulses individually on various lines is more complex than using them on all lines or blocks of lines. Hence AGC edge(s) which coincide with pre-existing signal features such as end of sync pulse and/or existing system clocks (e.g. 13.5 MHz, 27 MHz, etc video pixel clock) is highly beneficial to simplify/ease implementation of signal generation/modification. Specifically preferred values for $t_1$, being the start time of the AGC pulse relative to the start of the sync pulse (which is conventionally considered the start of a line), may include values between 2 µs and 5 µs. Specifically preferred values of $t_2$, also measured relative to the start of the sync pulse, may include values between 4 µs and 6 µs, which meet the above criteria, especially those where the value of $t_2-t_1$ is between 0.5 µs and 3 µs, and especially approximately 1 µs. Other preferred values for $t_1$ may be around 3.8 µs and specifically 3.815 µs. Other preferred values for $t_2$ may be around 4.9 µs and specifically 4.889 µs.

The AGC pulse raises the voltage above the blanking level by a predetermined amount $V_1$. This voltage is also dependent on the same or similar factors mentioned above. A voltage between 0.1 and 1.1V is preferred, 0.5V-0.9V is even more preferred, with approximately 0.7V seeming to represent an ideal compromise between all factors.

Although the AGC pulse as described can be considered a modification of an existing sync pulse within the video signal, it is possible to add an AGC pulse without modifying sync pulses. Rather than the type of signal shown in FIG. 3, the AGC pulse may begin at the trailing edge of the sync pulse, or may be separated from the sync pulse by a particular time. In this way, an AGC pulse can be used in embodiments of the invention without requiring the modification of the sync pulse.

Other methods of applying copy protection to analogue signals exist, such as modifying tri-level sync signals, for high definition signals. ED standards for enhanced or extended definition provide the progressively scanned version of SD picture formats. Particularly in the US, the term refers to devices capable of displaying 480 or 576 line signals in progressive scan (commonly referred to as "480 p (NTSC)" and "576 p (PAL)" respectively) as opposed to interlaced scanning, commonly referred to as "480i (NTSC)" or "576i (PAL)". For example, 576p/625p or 480p/525p, rather than "normal" interlaced SD which is 576i/625i and 480i/525i. ED may sometimes be referred to as SD progressive or 576 p or 480 p. It can have sync pulses (and hence ID/AGC pulses) like SD or HD depending on which standard is followed. SD-style pulses for ED are more common than HD-style syncs for ED.

Figure 4:
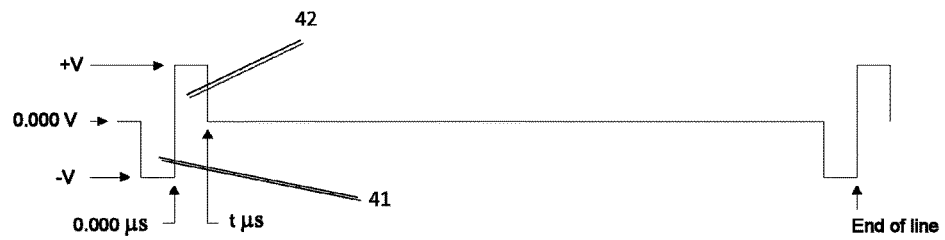
FIG. 4: shows a standard luminance signal line for HD.

FIG. 4 shows the high definition (HD) equivalent of FIG. 2. As with the single level pulse, the HD tri-level pulse occurs before/after video image data, and the present invention is preferably concerned with the HD tri-level pulses occurring during the VBI, or some other time during which no image data is being reproduced on a display. A negative pulse 41 occurs followed by a positive pulse 42 at a particular time afterwards.

Figure 5:
FIG. 5: shows a copy protected luminance signal line for HD.

FIG. 5 shows the tri-level sync pulse with a copy protection signal applied to it. Copy protection may be achieved by altering the tri-level sync signal by removing one of the pulses to make it a single level signal. As shown, this may be achieved by removing the top or positive signal. The recording device would be configured to look for the modified signal as an indication that copy protection is being applied.

As an additional part of the copy protection process according to embodiments of the invention, an ID code is incorporated into the signal modification performed to incorporate copy protection into the signal. The ID code can be used, amongst other data, to identify specific entities by containing data indicative of an entity. In particular, the ID code is incorporated by amending or altering the copy protection applied to the media content/video signal. Examples of how this may be achieved will be described below, both for standard definition (SD) and high definition (HD) outputs.

Beginning with the SD example, it will be assumed that there are a predetermined number of lines during a period for which copy protection is being applied. In particular, this may be the period during the VBI where no video/media content is being output, and/or the period during the overscan where the video/media content will not be displayed on most TVs.

In this example a "bit" of information is determined as the presence, or absence, of the copy protection AGC signal for a given sync pulse, or line. Hence a sync pulse 21 in FIG. 2 may be identified as a logic "0" and a sync pulse 31 as in FIG. 3 may be identified as a logic "1" (or vice versa). For a given period, or number of lines, these predefined bits can be used to build a code or identifier into the video output of the set top box or other media content output device. For example, eight lines may be used to produce an 8 bit code. Preferably, extra data is added to aid detection and/or synchronisation of detection, such as in the event of a noisy signal, or where vertical sync pulses are lost/removed/altered/moved, such that line(s) before and/or after the lines carrying the actual code data are also modified to contain known values (for example, binary 1(s), or 0(s)). Preferably one start bit (value 1) and finish bit (value 1) are always present to indicate the start and the stop of a code and the middle 8 bits being altered to produce different codes or identifiers.

Figure 6:
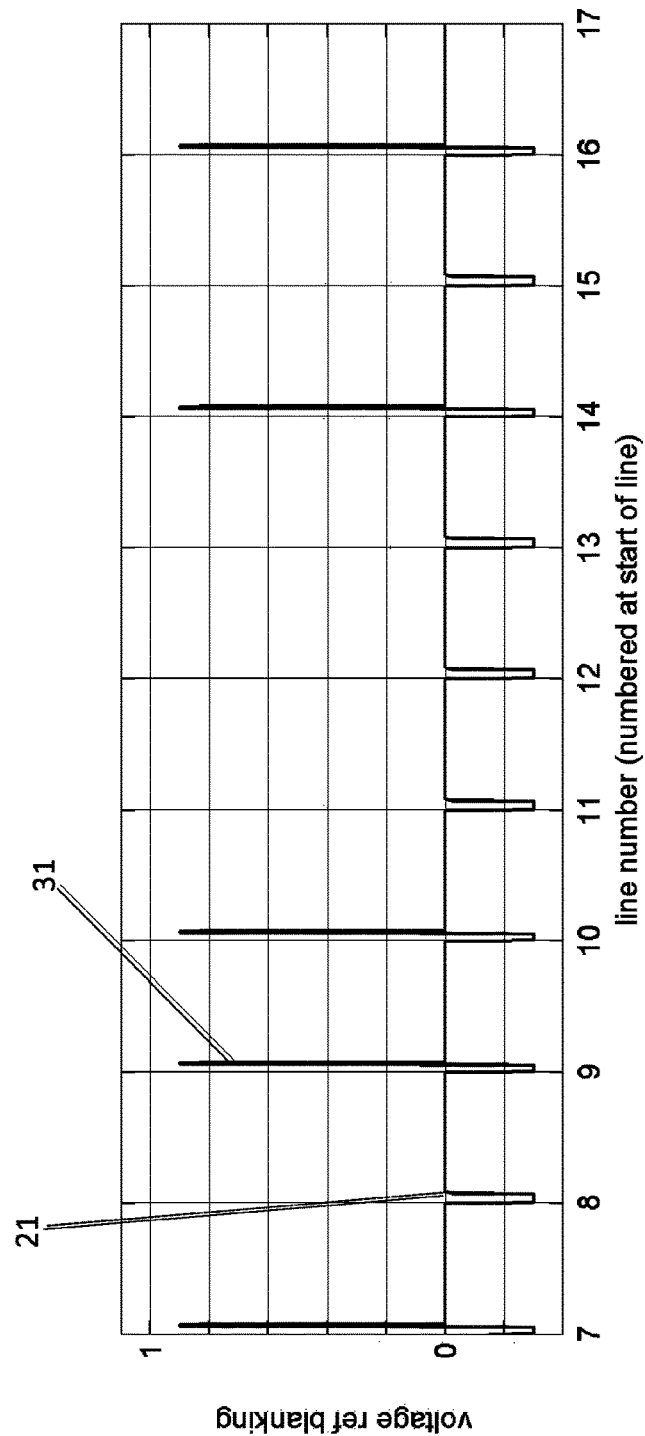
FIG. 6: shows an example encoded ID code.

FIG. 6 shows an example comprising a number of different pulses used to encode an ID code within a video signal. The pulses each comprise one of the pulses from either FIG. 2 or FIG. 3. In this example, the shorter "regular" pulses (e.g. pulse 21) are the same type of pulse as shown in FIG. 2 and indicate a "0"; the taller "copy protection" pulses (e.g. pulse 31) are the same type of pulse as shown in FIG. 3 and indicate a "1". The start and end bits at lines 7 and 16, are set to "1" automatically as described above. The resulting bit code from the arrangement of pulses of FIG. 6 would be "01100010". Of course, the alternative arrangement could be used with pulses such as 21 indicating a "1" and pulses such as 31 indicating a "0". It should also be noted that it is possible to code more than one bit per line by using different voltage levels of the AGC signal pulse, as shown in 31 of FIG. 3, to represent different binary values. A first voltage level may indicate a first logic state, a second voltage level may indicate a second logic state, a third voltage level may indicate a third logic state and so on. For example, 0V may indicate 00, 0.3V may indicate 01, 0.6V may indicate 10 and 0.9V may indicate 11.

A very similar arrangement can be used for HD copy protection. Rather than the pulses of FIG. 6 corresponding to the pulses shown in FIGS. 2 and 3, they may instead correspond to the pulses shown in FIGS. 4 and 5. In this way the same coding can be achieved. This allows the system/method to be applied to HD 720, 1080, or any other type of HD signal. It should be noted that, in the event that the sync pulse shown in FIG. 4 indicates a logic "0" and the sync pulse shown in FIG. 5 indicates a logic "1", the corresponding HD ID code in FIG. 6 would be "10011101". Whilst the copy protection signal used in HD copy protection could be modified in the same or similar ways to that described above for standard definition copy protection, this is not necessarily required to ease detection. Embodiments of the invention may rely on simply detecting the HD copy protection modifications to the signal.

It will be appreciated that embodiments of the invention could be adapted to function with different numbers of lines, and in different broadcast standards. A different number of lines allow an ID code of "x" bits to be defined, with x being related to the number of lines. Typically, for an x-bit code, x lines are required, plus preferably two extra lines before the start and after the end of the code as described above. An 8 bit code as described above would theoretically allow the identification of 256 entities. If more entities were to be identified, the amount of data contained in the code could be increased by spreading or distributing a given code between different frames of video. For example, a code could begin in a first frame of video, and continue in the subsequent frame of video. The waveform modification module, described below, can be configured to track frame numbers to keep track of the start and end of a code. In this way, a larger amount of data can be encoded into the copy protection signal. In such a scenario, it is desirable to insert known or synchronisation codes into field(s) or frame(s) of video, for example, signalling 00000000 in one frame, then 11111111 in the following frame, then sending the data in the subsequent N frames, before sending 11111111 in the penultimate frame, then 00000000 in the final frame of the sequence. The data may be encoded, transposed, interleaved, and/or error protected across the lines and/or fields and/or frames using common techniques to increase the robustness of the data against noise and signal disturbances. However, due to the number of frames of video per second (typically 25 or approximately 30), the simplest approach to ensure detection is repetition, coupled with frame averaging in the detector if required.

It is, preferably, the media content output device (e.g. a STB), and particularly an analogue video encoder module, that modifies the media content signal or waveform to incorporate the ID code before it is output to a display. This process is preferably performed by the same module that introduces the sync signals into the final signal such that it is displayed correctly on the display.

Figure 7:
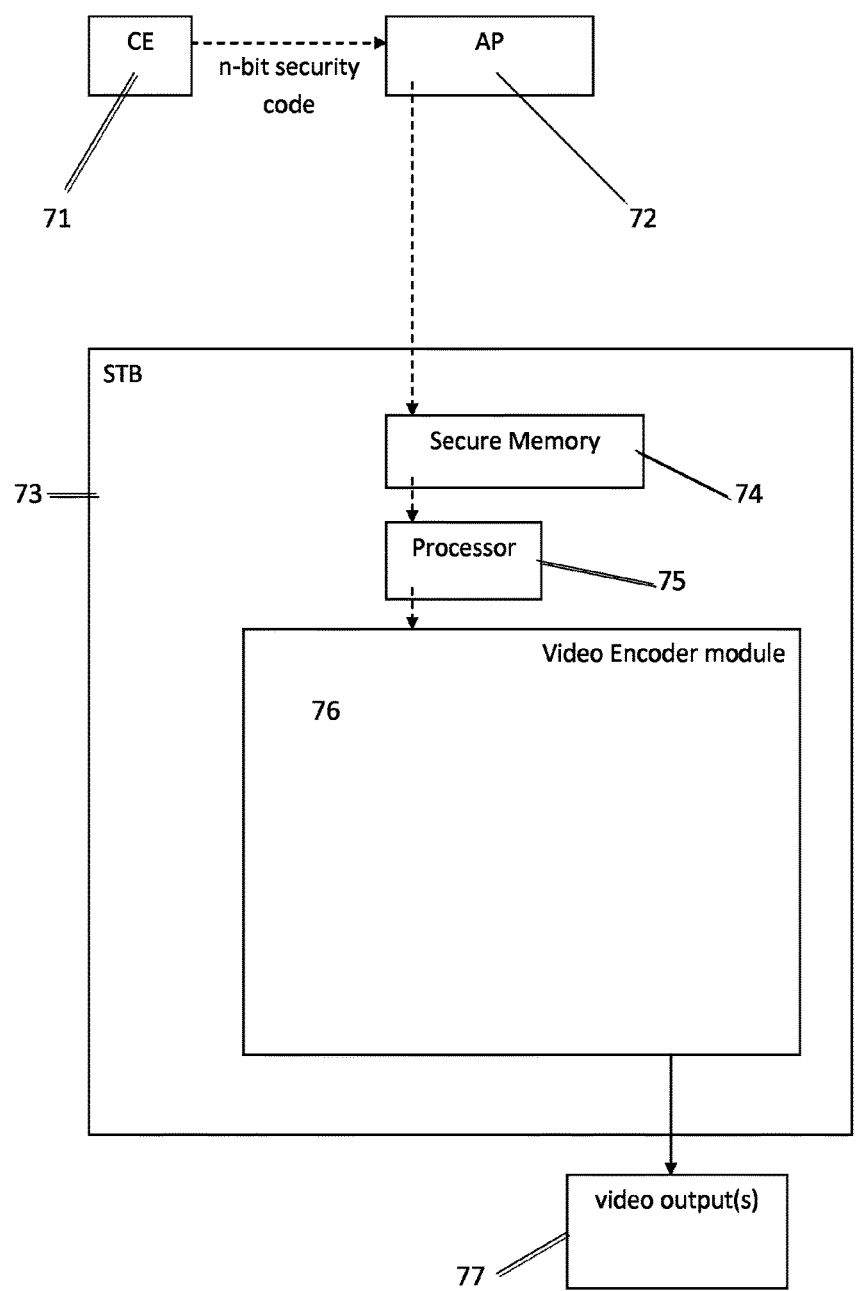
FIG. 7: shows how a first code is inserted into a STB.

As mentioned above, the aim of inserting the identification code into the output media content/video waveform is to uniquely indentify, in the output content, the entity associated with the STB. Usually this will be the STB manufacturer or the network operator or other party who wishes to activate the copy protection functionality that would otherwise be dormant or un-activated within the device. Rather than provide the identification code directly to the associated party to store on the STB for later insertion, embodiments of the invention rely on an n-bit first code and an m-bit second code. The first code, having "n" number of bits, is inserted into the STB, and the STB is able to generate the m-bit second code from the n-bit first code. This sequence of events is shown in FIG. 7. The transformation from the n-bit code to the m-bit code is carried out in a manner that the STB manufacturer or other third party has no access to. In particular, the process may occur within the STB, completely within an integrated semiconductor circuit, which is self contained and cannot be accessed from outside without physically damaging the apparatus, or in software which is encrypted and/or processed on a secure processor, and/or hardened against tampering using known techniques.

As shown in FIG. 7, the controlling entity (CE) 71 supplies an n-bit first code to the associated party (AP) 72. The AP loads the n-bit first code into a memory 74 on the STB 73 via an input (not shown). The memory 74 may be a flash memory, and is preferably a second memory that cannot be accessed by an external party and is only able to be used internally by the STB. The memory may also be a register. In some embodiments no memory may be required, since the first code may be transmitted, on demand, periodically or continuously, from the head end of the broadcast system and received and decoded by the STB when it is required. After the n-bit first code is stored in the STB memory 74, it is used by a video encoder module 76, via a processor 75, which derives the m-bit second code from the n-bit first code. The m-bit second code contains the instructions for application of the ID code to the media content/video output.

Figure 8:
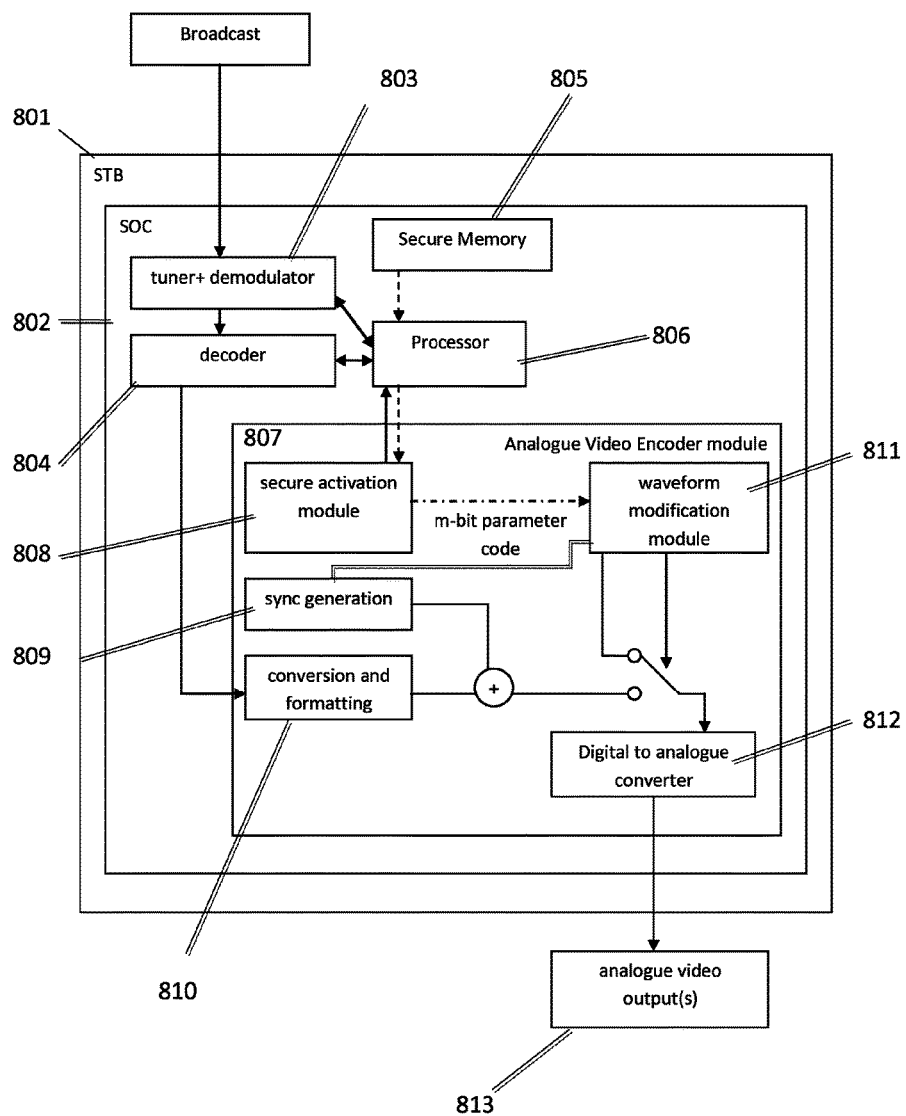
FIG. 8: shows a STB according to an embodiment of the present invention.

FIG. 8 shows a more detailed example of a STB according to an embodiment of the present invention. In the following discussion it will be assumed that the n-bit first code has already been loaded onto the second memory 805 as described for FIG. 7.

The STB 801 of FIG. 8 comprises a system on chip (SOC) 802, which may comprise an integrated circuit having a number of components or modules located thereon. In this embodiment, the SOC comprises a tuner and demodulator 803 for receiving broadcast data and extracting and demodulating the desired data corresponding to particular media content or a particular broadcast channel. The tuner tunes to a particular digital broadcast frequency and the demodulator converts the signal from the tuner into a digital signal for subsequent processing if required. The tuner and demodulator may be external to the set top box, or the SOC. A decoder 804, which may be a separate module, or whose functionality may be executed on a general purpose processor using appropriate software, but most commonly is a dedicated hardware element within the SOC, is provided for decoding the media content (audio or video). Commonly there is also a muxing and switching section to route multiple signals (e.g. from two tuners, a HDD, a USB device, etc) to one or more outputs and/or storage devices—it will be appreciated that the content could come from any such source, and be routed before or after decoding, with the copy protection being applied before the output in each case. This is not shown in FIG. 8 for simplicity. The decoder output is provided to the video encoder module for conversion and formatting of the signal, by the conversion and formatting unit 810. A master clock (not shown) is provided for driving logic to signal frame sync and line sync times, this may be provided along two data lines which are set to logic "high" for just a single clock pulse at these sync times. This causes the sync generation module 809 to create the actual horizontal and vertical sync waveforms that appear on the analogue video output. Normally, after conversion and formatting of the data to comply with the data requirements of the display system, the media content is converted to analogue and provided to an output for display. However, in the arrangement of FIG. 8, additional formatting of the data occurs.

As shown in FIG. 8, a broadcast, containing modulated media content data, is received by the STB. Typically, an instruction in the broadcast stream indicates that copy protection should be applied to the current programme, channel, service etc. Alternatively the STB is pre-programmed to apply copy protection to the same via software instructions or a look-up table or similar contained in a memory. In the simplest implementation, the STB is programmed to apply copy protection to all content.

The determination as to whether copy protection should be applied to a particular programme is made by the processor, by checking the relevant copy protection bit, or instruction in the broadcast or based on a universal instruction to apply copy protection. However this occurs, upon recognising the need to apply copy protection to the current programme, the processor retrieves the n-bit first code from memory 805, or directly from the broadcast itself, and writes it to a register on the analogue video encoder module 807, which in turn feeds the code to the secure activation module 808 therein.

The secure activation module 808 decodes and decrypts the n-bit first code to an m-bit parameter or second code, where typically m<n, and preferably n is much greater than m. For example, n may be 60 and m may be 10, 20 or more. The algorithm for decryption is known only to the CE, and other trusted parties if required, and is not revealed to any other party. The algorithm is such that only a small sub-set of n-bit first codes generate valid m-bit second codes, with all other first codes causing the secure activation module to send a fixed, unusable m-bit code to the waveform generation module 811, while, preferably, impairing or disabling the STB such as by simultaneously sending an instruction to the processor to lock the STB until the power is disconnected. In this way, it is challenging to try to find valid n-bit first codes by random probing. Further, the relationship between the n-bit first code and the m-bit second code is non-trivial. The secure activation module is preferably a secure semiconductor component and may be implemented as a monolithic semiconductor integrated circuit. The m-bit code is not available externally, not even to the STB manufacturer when testing and developing the STB, and is passed securely to the waveform modification module.

The waveform modification module 811 is arranged to alter the converted and formatted media content signal to introduce copy protection and the appropriate ID code. The m-bit second code directly controls the function of the waveform modification module setting the parameters (e.g. voltage, timing, line number, frequency, type) of the signal modifications(s) that is/are applied. If the m-bit second code were made available such that it could be accessed directly from the processor, then a skilled person with access to the processor (e.g. the STB manufacturer) could determine, via trial error, a suitable m-bit second code to generate the required waveform modification to yield a specific copy protection signal. Hence the only access to the m-bit second code on the waveform modification module 811 is from the secure activation module 808. The waveform modification module also receives sync signals from the sync generator 809, or alternatively from a separate sync generator (not shown) allowing it to determine at what points in the signal to insert the necessary copy protection signals. A switch is provided to switch between the converted and formatted video signal and the modified signal of the waveform modification module so as to allow the insertion of the altered waveform into the video signal. The switch may be controlled by the waveform modification module such that the altered waveform is inserted in the correct locations of the video signal. Two data lines from the sync generator (H-sync and V-sync) may be sent to the waveform modification module directly if available. Alternatively the output from the analogue video encoder module can be split, with one path going to one input to the waveform modification switch, and the other going through a "sync separator+logic" to recover the two data lines from the analogue video signal.

The n and m bit codes may be tens or hundreds of bits long. The m-bit code preferably contains at least 8-bits of ID information, as in the example above, along with multiple bits to control the copy protection applied to enable the copy protection functionality. Since only a small sub-set of n-bit first codes generate valid m-bit second codes the number of bits, "n", in the first code may be an order of magnitude larger than the number of bits in the second code, m, or at least the number of bits used for the ID information to be encoded as the ID code. The second code, and therefore also the first code, controls both the ID code applied to the output and the underlying copy protection parameters applied in order to activate the dormant functionality, which in this embodiment is a copy protection functionality.

Figure 9:
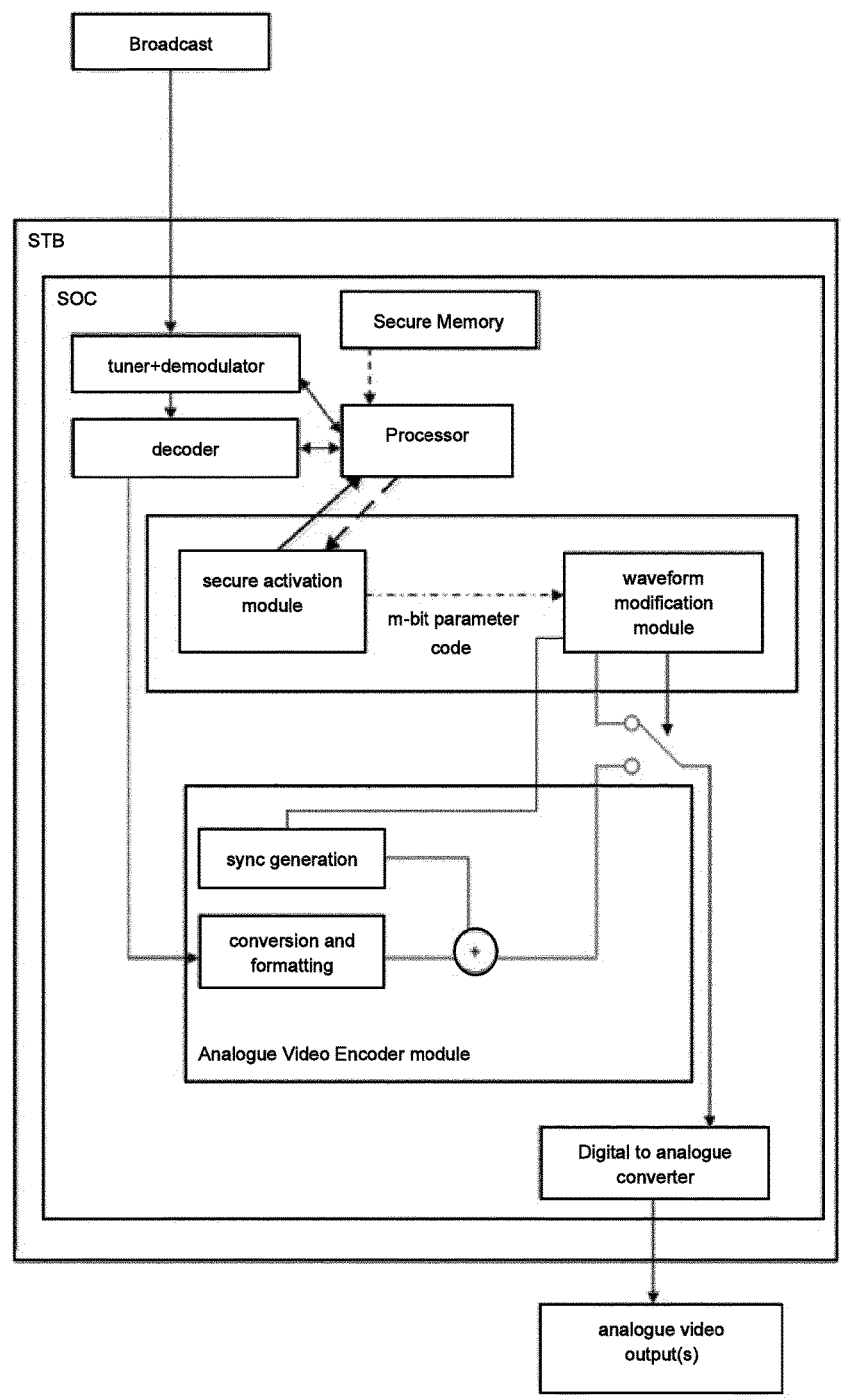
FIG. 9: shows an alternative STB arrangement according to an embodiment of the present invention.

The restriction of access to the m-bit second code is carried out as a result of the configuration and/or design of the video encoder chip. Either the relevant parts are in a secure section of the chip, the secure section also being used, for example, for conditional access processing and descrambling, or actual physical hardwiring of the internal data busses is used, or by internal registers that can only be accessed by the secure activation module, and not by any other software running on the SOC. The fact that the secure activation module and waveform modification module are located on a common chip, and preferably a monolithic chip makes it physically difficult to extract any useful data from them. The second code is not writeable, readable or otherwise accessible externally to the chip or the STB. As shown in FIG. 8, the secure activation module and waveform modification module may be located on the same chip or same integrated circuit as the video encoder module and may physically be part of the video encoder module functional unit. However, the secure activation module and waveform modification module may be themselves formed as a common functional unit separate to the video encoder module as shown in FIG. 9, which shows a STB arrangement containing the same functional elements as FIG. 8, but with a slightly different physical layout. In the arrangement of FIG. 9, the output of the video encoder module and the waveform modification module are switched between by the switch controlled by the waveform modification module. The output is provided to the digital to analogue converter, which need not be part of the video encoder module functional unit. As an alternative the secure activation module and waveform modification module need not be part of the SOC integrated circuit. They may instead be provided together on a separate integrated circuit from the main SOC, provided there is secure communication between the secure activation and waveform modification modules (either physically secure, or via some form of encryption/protection/verification) and preferably also with the SOC to allow the introduction of the modified signal/waveform into the output signal.

A further challenge to finding a usable n-bit first code by chance is that many "valid" n-bit first codes which generate "valid" m-bit second codes will cause unsuitable signal modifications that either do not result in effective copy protection, or yield a signal which cannot be correctly displayed on a typical domestic television or display. Preferably when an invalid n-bit first code is received, it is one such unusable m-bit code which is sent to the waveform modification module. Substantially all invalid n-bit codes preferably cause substantially the same m-bit second code to be generated, so revealing nothing of the inner workings of the secure activation module. This may be achieved by checking, in the secure activation module, whether the first code is a valid code. If it is determined to be invalid, then a common second code may be provided to the waveform modification module. A further cryptographic arrangement could be used to determine the authenticity of the first code, with a key being stored in the secure activation module. This could be done using any appropriate encryption method such as AES, DES or triple DES for example.

The secure activation module functions to transform the n-bit first code to the m-bit second code, which contains the instructions and/or binary data to generate/represent the ID, for the party associated with the STB.

The association between the ID code encoded into the video output of the STB, the associated party originally granted the first code and optionally also the first code used to generate the second code may be stored in a database or lookup table kept by the controlling entity. In this way, the controlling entity or other trusted party can compare the ID code encoded in the video signal output by the STB with the corresponding party associated with that ID code on the database or lookup table. If the controlling entity suspects that the additional functionality, such as copy protection, is being used without authorization, the output ID code of the video signal can be checked by an appropriate measuring device to identify the first code used to unlock the additional functionality. Alternatively the ID can be an ASCII or other representation of the associated party's name and/or other details, such that no look-up table is required. This representation may itself be encrypted using a key known only to the controlling entity, the advantage being that a single key is easier to maintain than a look up table.

The term "broadcasting" used herein should be taken to encapsulate delivery of data by any form such as over the air, via the Internet, cable or satellite or any other type of transmission. The same principles may also be applied to delivery of physical media, wherein the first code is stored on the physical media itself (e.g. DVD, BluRay disc, etc) for tracking certain parties, or stored in the output device (e.g. DVD player, BluRay player, etc) for tracking certain other parties.

Embodiments of the invention have been described in relation to user devices for displaying multimedia content such as video or images. In particular, the invention finds utility in set-top-boxes for receiving and descrambling broadcast video and accompanying audio data. It will be appreciated that the term "set-top-box" may include any device able to impart the required functionality to a television receiver, whether provided in a standalone box, incorporated in a standalone box with other devices, or integrated within the television receiver. This would include televisions with inbuilt set-top-boxes, suitably programmed computers having the appropriate receiver functionality or connected to the Internet or other network, mobile phones or similar mobile devices able to output media content, PDAs and so forth.

Embodiments of the invention have been described in relation to devices in which the functionality being activated by the controlling entity is copy protection. Specific forms of copy protection have also been described. It will be appreciated that embodiments of the invention may work with other forms of copy protection. In particular, any form of copy protection may be used in which the output signal, such as a video signal, is modified in a predetermined way to introduce a detectable portion into the output signal. The manner in which the copy protection is applied to the final signal is altered such that the modifications made to the signal by the copy protection method are also used to encode data, such as identification data or codes. The alterations may involve removing some of the modifications to the signal made by the unmodified copy protection method. Specifically, the alterations are arranged so as not to substantially compromise the strength of the copy protection. Embodiments may be applied to digital copy protection methods also, where the copy protection is applied by modifying a signal in a manner analogous to that described above.

Although embodiments have been described in relation to specific applications, wherein the output device is a set top box and the functionality to be enabled is copy protection of the output of the set top box, it will be appreciated that embodiments of the invention can be applied to any output device, and particularly electronic output devices, in which it is desired to be able to control the enabling of a functionality that lays dormant without activation and in which it is desired to trace the entity given permission to activate the functionality in the output device. Such output devices may include computers, mobile phones, smartphones, PDAs, tablets, or any device equipped with an output being for media content or otherwise.

What is claimed is:

1. A method of modifying the output of an output device, the method comprising:
   retrieving a first code, associated with a first recipient party;
   generating within the output device, using the first code, a second code, the second code containing encoded data identifying the first recipient party and a direction to activate an additional functionality of the output device;
   activating the additional functionality in accordance with the direction contained in the second code by unlocking existing instructions in the output device that implement the additional functionality in the output device; and
   modifying an output of the output device according to the data encoded in the second code, to encode a third code in the output of the output device, the third code including an ID code associated with the first recipient party.

2. The method according to claim 1 wherein the ID code is not derivable from the first code in an obvious manner.

3. The method according to claim 2 wherein the first code is not derivable from the second code in an obvious manner.

4. The method according to claim 2 wherein the second code is obtained by decrypting or decoding the first code.

5. The method according to claim 4 wherein the first code comprises n bits and the second code comprises m bits, wherein n is greater than m, and wherein only a subset of n-bit first codes are valid such that they generate a valid m bit second code that activates the additional functionality.

6. The method according to claim 5 wherein generating the second code includes checking whether the first code is a valid code and, for all other n-bit first codes other than the valid n-bit first codes, generating a fixed m-bit second code such that the additional functionality is not activated.

7. The method according to claim 6, the method further comprising impairing or disabling the output device when an invalid first code is used to generate a second code.

8. The method according to claim 7, wherein the output of the output device is a video signal and the additional functionality activated by the first code is copy protection of the video signal, the second code containing instructions on how copy protection should be applied to the output device's output.

9. The method according to claim 8, wherein the copy protection is applied by modifying at least a portion of a line within a frame of video, the line being located within a blanking interval.

10. The method according to claim 8 wherein the copy protection is applied by altering sync pulses within lines of video and the third code is encoded in the output video signal by selecting which sync pulses are altered based on the instructions contained in the second code.

11. The method according to claim 10 wherein the sync pulses are altered by altering their duration, the duration to which they are altered not corresponding to the duration of other pulses within the video signal.

12. The method according to claim 9 wherein the modification of the output of the output device includes inserting an additional pulse, such as an AGC pulse, the additional pulse spanning between a first time $t_1$ and a second time $t_2$.

13. The method according to claim 12 wherein the edge of the additional pulse coincides with an edge of a sync pulse.

14. The method according to claim 12, wherein
   $t_1$ is between 2 µs and 5 µs from the start of a line; and/or
   $t_2$ is between 4 µs and 6 µs from the start of a line; and/or
   the value of $t_2-t_1$ is between 0.5 µs and 3 µs.

15. The method according to claim 10 wherein the lines before and/or after the lines modified to incorporate the third code are also modified to indicate predetermined values, the predetermined values being logic "1".

16. The method according to claim 1, wherein the output device is a smart phone.

17. The method according to claim 1, wherein the output device is a computer.

18. The method according to claim 1, wherein the output device is a tablet.

19. An output device comprising;
   a memory for storing a first code associated with a first recipient party;
   a secure activation module circuit, coupled to the memory, configured to generate a second code using the first code, the second code containing encoded data identifying the first recipient party and a direction for activating an additional functionality of the output device;
   a modification module configured to implement the direction to activate the additional functionality and further arranged to modify the output of the output device, according to data encoded in the second code, by unlocking existing instructions in the output device that implement the additional functionality in the output device, to encode a third code in the output of the output device, the third code including an ID code associated with the first recipient party; and
   an output.

20. The output device according to claim 19 wherein the secure activation module circuit is arranged to generate the second code by decrypting or decoding the first code.

21. The output device according to claim 19, wherein the first code comprises n bits and the second code comprises m bits, wherein n is greater than m, and wherein only a sub-set of n-bit first codes are valid such that they generate a valid m bit second code that activates the additional functionality, wherein the output device or integrated circuit is arranged to:
   check whether the first code is a valid code and, for all other n-bit first codes other than the valid n-bit first codes, generate a fixed m-bit second code that does not activate the additional functionality.

22. The output device according to claim 21 further configured to impair or disable the output device when an invalid n-bit code is used to generate a second code.

23. The device according to claim 22, wherein the secure activation module circuit is a secure semiconductor component implemented as a monolithic semiconductor integrated circuit.

24. The device according to claim 23, wherein the secure activation module circuit and modification module circuit are located on a monolithic common chip.

25. The device according to claim 24, wherein the second code is passed securely from the secure activation module circuit to the modification module circuit.

26. The device according to claim 25 wherein communications between the secure activation module circuit and the modification module circuit are encrypted and/or password protected.

27. The device according to claim 26, wherein:
the output device is configured to output a video signal, the modification module circuit further being arranged to modify the video signal output to apply copy protection to the video signal, the copy protection being applied in accordance with instructions encoded in the second code; and
the modification module circuit is further arranged to modify at least a portion of a line within a frame of video.

28. The device according to claim 27 wherein the modification module circuit is further arranged to apply copy protection by altering sync pulses within lines of video and to encode the third code in the output video signal by selecting which sync pulses are altered based on the instructions contained in the second code.

29. The device according to claim 28 wherein the secure activation module circuit and modification module circuit are located on the same chip or integrated circuit as a video encoder module.

30. An integrated circuit for use in an output device, the integrated circuit comprising:

a secure activation module circuit configured to receive a first code associated with a first recipient party and to use the first code to generate a second code, the second code containing encoded data identifying the first recipient party and a direction for activating an additional functionality of the output device; and a modification module circuit configured to implement the direction to activate the additional functionality and further arranged to modify the output of the output device, according to data encoded in the second code, by unlocking existing instructions in the output device that implement the additional functionality in the output device, so as to encode a third code in the output of the output device, the third code including an ID code associated with the first recipient party.

31. A method of modifying the output of an output device, the method comprising:

retrieving a first code, associated with a first recipient party;

generating within the output device, using the first code, a second code, the second code containing encoded data identifying the first recipient party and a direction to activate an additional functionality of the output device, the direction for activating the additional functionality in the second code comprising appropriate instructions for implementing the additional functionality in the output device;

activating the additional functionality in accordance with the direction contained in the second code; and modifying an output of the output device according to the data encoded in the second code, to encode a third code in the output of the output device, the third code including an ID code associated with the first recipient party.

* * * * *